(No Model.)
R. R. WILSON.
CANE CUTTER.
No. 447,994. Patented Mar. 10, 1891.
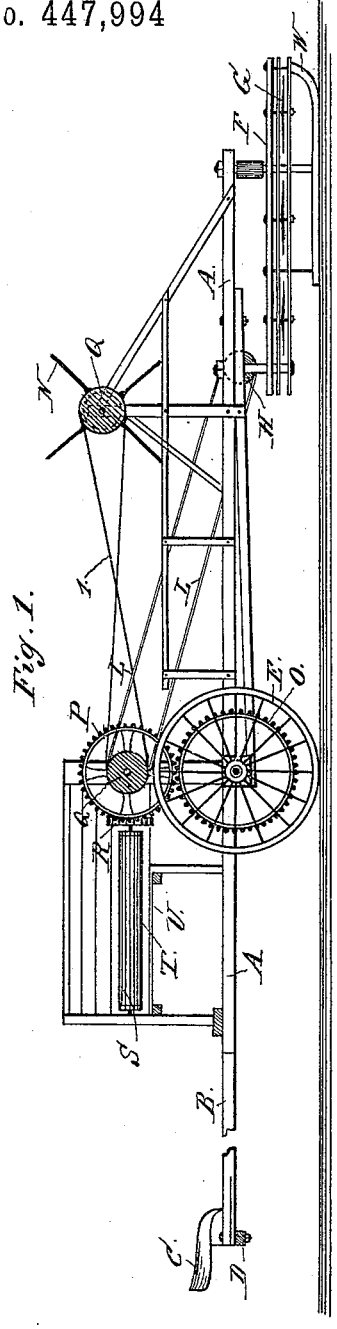
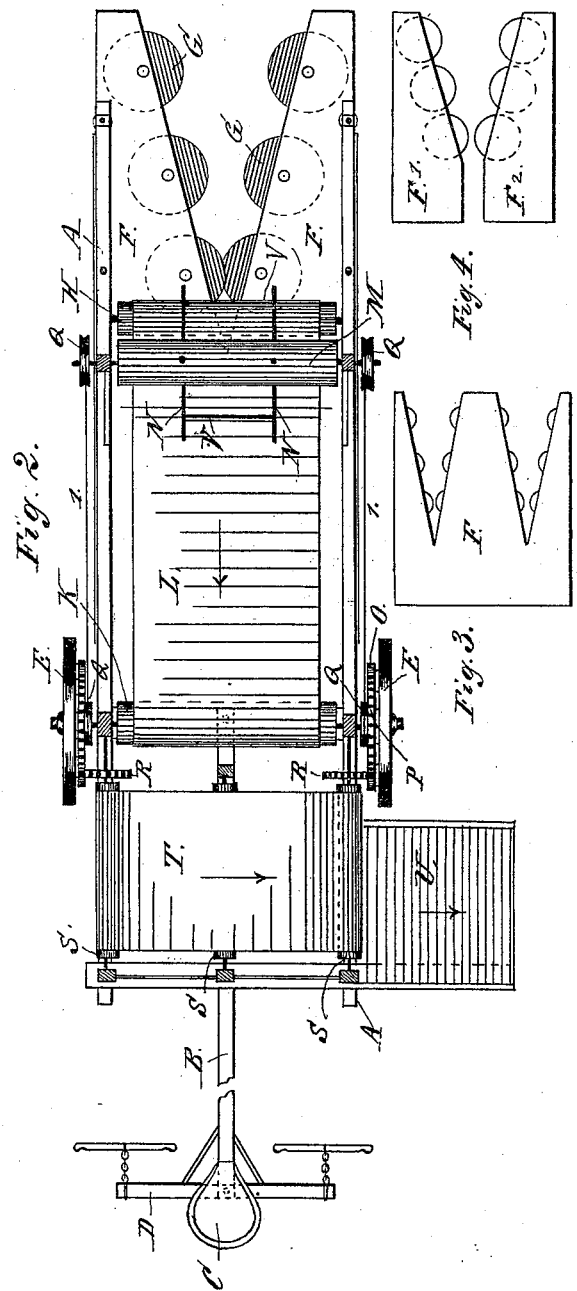
WITNESSES
Helmuth Holtz
Percy D. Parks
INVENTOR
Robert R. Wilson.
by Wm R Stringfellow
Attorney
THE NORRIS PETERS CO., PHOTO-LITHO., WASHINGTON, D. C.

United States Patent Office.

ROBERT R. WILSON, OF NEW ORLEANS, LOUISIANA, ASSIGNOR OF ONE-THIRD TO LOUIS P. FULDA, OF SAME PLACE.

CANE-CUTTER.

SPECIFICATION forming part of Letters Patent No. 447,994, dated March 10, 1891.

Application filed June 26, 1890. Serial No. 356,885. (No model.)

*To all whom it may concern:*

Be it known that I, ROBERT REDDINGTON WILSON, a citizen of the United States, residing at New Orleans, in the parish of Orleans and State of Louisiana, have invented certain new and useful Improvements in a Cane-Cutter; and I do declare the following to be a full, clear, and exact description of the invention, such as will enable others skilled in the art to which it appertains to make and use the same.

My invention relates to an improvement in a cane-cutter, and its novelty will be fully understood from the following description when taken in connection with the annexed drawings; and the objects of my invention are to provide a device that will cut sugar-cane, corn, and cotton stalks. I attain these objects by the mechanism illustrated in the accompanying drawings.

The invention claimed herein is an improvement upon a cane-cutter for which Letters Patent were issued to me on the 19th day of November, 1889, No. 415,234.

Figure 1 is a side view. Fig. 2 is a top view. Fig. 3 is a top view of knives and frame for cutting corn and cotton stalks. Fig. 4 is a top view of knives and frame for windrowing cane.

Similar letters refer to similar parts throughout the several views.

Referring to the drawings, A designates a frame or running-gear of my cane-cutter, B showing a pole attached to the axle of wheels E, and secured to said pole is a seat C for the driver, D being a doubletree with singletrees attached.

F, as shown in Fig. 1, is a frame in which knives G are placed.

H and K are rollers, over which pass an endless carrier L. Placed above the roller H is a roller M, which rotates in an opposite direction from H, upon which are arms N and braces V. Attached to each end of rollers M and K are pulleys Q, over which pass belts I. Attached to wheel E is a geared wheel O, which operates in conjunction with wheel P, and the wheel P works in combination with geared wheels R, which are attached to rollers S, and over said rollers passes an endless carrier T, and situated at one end of the same is a chute U, the forward end of the frame A resting on runners W.

The mode of operation is as follows: For cutting cane for the mill, the stalks being stripped of their foliage, the cutter is placed in the position as shown in Fig. 1, the runners W resting on each side of the cane-row. A pair of mules or horses are attached to pole B by means of doubletree D, and the singletrees adjusted thereon. The team pulls forward, the runners W advance, and the cane comes in contact with circular knives G, which cut the cane, and as thus cut it falls between arms N, and by means of braces V, which extend between said arms, the cane is forced downward upon carrier L, where it rests until it reaches the point where the carrier passes over roller K, when it falls upon carrier T, which conveys the cane to chute U, where the cane is discharged from the machine. Where it is desired to windrow the cane, I remove the roller M, carriers L and T, and connections and frame F, and attach the frame F' F², as shown in Fig. 4.

Where it is desired to cut corn, Chinese sugar-cane, corn or cotton stalks, I use my knife-frame, as shown in Fig. 3, which enables me, with rollers and carriers removed, to cut two rows of corn, Chinese sugar-cane, or corn or cotton stalks at one operation.

Having described my invention, what I claim, and desire to secure by Letters Patent, is—

1. The combination, with the main frame mounted on runners and traveling wheels, as described, of the cutting apparatus carried by said runners, the cog-gears fixed to said traveling wheels, the transverse drum journaled in the main frame above the traveling wheels and carrying gears meshing with the gears of said wheels, the transverse drum H, journaled in the frame above the rear end of the cutting apparatus, the endless carrier traveling around the drum H and the transverse drum above the traveling wheels, and the longitudinal drums journaled at the sides of the frame in rear of the traveling wheels and carrying gears meshing with the gears of said wheels, all adapted to operate substantially as and for the purpose specified.

2. In a cane-cutter, substantially as described, the main frame mounted on runners and traveling wheels, the cutting apparatus carried by said runners, the cog-gears fixed to said traveling wheels, the transverse drum K, journaled in the main frame above the traveling wheels and carrying a pulley at its end, the transverse drum H, journaled in the frame above the rear end of the cutting apparatus, the endless carrier traveling around the drums H and K, and the longitudinal drums journaled at the sides of the frame in rear of the traveling wheels and carrying gears meshing with the gears of said wheels, and the endless carrier traveling around said longitudinal drums, in combination with the reel-shaft journaled in the frame above the cutting apparatus and the drum H and carrying a pulley at its end connected by an endless belt with the pulley on the shaft K, substantially as and for the purpose specified.

In testimony whereof I affix my signature in presence of two witnesses.

ROBERT R. WILSON.

Witnesses:
PERCY D. PARKS,
JNO. H. ADAMS.